United States Patent
Ohmiya (10) Patent No.: US 8,284,419 B2
(45) Date of Patent: Oct. 9, 2012

(54) SYSTEM AND DEVICE WITH SELECTION OF IMAGE FORMATION WHEN EMBEDDED DATA CANNOT BE WRITTEN IN A STORING PART ON A PRINT MEDIUM

(75) Inventor: Takashi Ohmiya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 538 days.

(21) Appl. No.: 12/575,125

(22) Filed: Oct. 7, 2009

(65) Prior Publication Data
US 2010/0110497 A1    May 6, 2010

(30) Foreign Application Priority Data

Oct. 31, 2008  (JP) ................................. 2008-280908

(51) Int. Cl.
H04N 1/00 (2006.01)
H04N 1/32 (2006.01)
H04N 1/44 (2006.01)
G06F 3/12 (2006.01)
G06K 17/00 (2006.01)

(52) U.S. Cl. ...... 358/1.14; 358/1.15; 358/438; 358/468; 340/13.26

(58) Field of Classification Search .................. 358/3.28, 358/1.13, 1.14, 1.15, 1.16, 400, 401, 434, 358/438, 443, 444, 468, 296; 340/12.1, 12.51, 340/13.24, 13.25, 13.26, 5.8, 5.86; 726/26–33; 283/72, 85, 901, 902
See application file for complete search history.

(56) References Cited

U.S. PATENT DOCUMENTS

| | | | |
|---|---|---|---|
| 8,049,934 B2 * | 11/2011 | Oshima | 358/3.28 |
| 2002/0170973 A1 | 11/2002 | Teraura | |
| 2003/0217274 A1 | 11/2003 | Nagatsuka | |
| 2005/0105140 A1 | 5/2005 | Ozaki | |
| 2008/0204818 A1 | 8/2008 | Nakano | |
| 2008/0239406 A1 | 10/2008 | Nakano | |
| 2010/0165387 A1 * | 7/2010 | Mizumukai | 358/1.15 |
| 2010/0188696 A1 * | 7/2010 | Ohmiya | 358/1.15 |
| 2010/0208292 A1 * | 8/2010 | Tomono | 358/1.15 |
| 2010/0214592 A1 * | 8/2010 | Muroi | 358/1.14 |
| 2012/0081747 A1 * | 4/2012 | Kobayashi | 358/1.15 |

FOREIGN PATENT DOCUMENTS

JP    2000-285203    10/2000
(Continued)

OTHER PUBLICATIONS

Office Action for corresponding Japanese Patent Application 2008-280908 mailed Aug. 24, 2010.

Primary Examiner — Scott A Rogers
(74) Attorney, Agent, or Firm — Banner & Witcoff, Ltd.

(57) ABSTRACT

An image-forming system includes a transmission device and an image-forming device. The transmission device includes a transmitting unit that transmits image data, command data instructing to form an image corresponding to the image data on a recording medium having a storing part and to write embedded data to the storing part, and first selection data indicating whether or not the image should be formed when the embedded data cannot be written in the storing part. The image-forming device includes an image-forming unit and a controlling unit. The controlling unit controls, when the image-forming unit cannot write the embedded data in the storing unit, the image-forming unit to form the image if the first selection data indicates that the image should be formed, and to fail to form the image if the first selection data indicates that the image should not be formed.

12 Claims, 5 Drawing Sheets

FOREIGN PATENT DOCUMENTS

| | | |
|---|---|---|
| JP | 2002-337426 | 11/2002 |
| JP | 2003-337683 | 11/2003 |
| JP | 2005-151357 | 6/2005 |
| JP | 2007-174212 | 7/2007 |
| JP | 2008-047966 | 2/2008 |
| JP | 2008-060788 | 3/2008 |
| JP | 2008-211717 | 9/2008 |
| JP | 2008-244880 | 10/2008 |

* cited by examiner

SYSTEM AND DEVICE WITH SELECTION OF IMAGE FORMATION WHEN EMBEDDED DATA CANNOT BE WRITTEN IN A STORING PART ON A PRINT MEDIUM

CROSS REFERENCE TO RELATED APPLICATION

This application claims priority from Japanese Patent Application No. 2008-280908 filed on Oct. 31, 2008. The entire content of this application is incorporated herein by reference.

TECHNICAL FIELD

The present invention relates to an image-forming system, a transmission device, and an image-forming device.

BACKGROUND

Recording media with a built-in storage unit (paper with a radio frequency identification (RFID) tag, for example) have been conventionally used in facsimile-type image-forming systems and the like. For example, in one such system a transmission-side facsimile device reads an image as image data from a sheet of paper having an RFID tag, reads the content stored in the RFID tag as RFID data, and transmits this data to a reception-side facsimile device. Upon receiving this data, the reception-side facsimile device forms an image on paper having an RFID tag that is loaded in the reception-side facsimile device based on the received image data, and stores the received RFID data in the RFID tag of the same sheet.

SUMMARY

Here, if the conventional system does not meet the conditions required for properly writing RFID data, such as when paper provided with an RFID tag is not loaded in the reception-side facsimile device, the ability to execute the image-forming operation described above depends on functions and settings on the reception-side facsimile device. This is not user-friendly for the user on the transmission side since this user can do nothing to ensure the image-forming operation is successful.

This type of problem is not limited to facsimile-type image-forming systems. For example, the same problem may occur in an image-forming system comprising a transmission device, such as a personal computer, and an image-forming device.

In view of the foregoing, it is an object of the present invention to provide an image-forming system, a transmission device, and an image-forming device capable of improving user-friendliness on the transmission side.

In order to attain the above and other objects, the invention provides an image-forming system including a transmission device and an image-forming device. The transmission device includes a transmitting unit that transmits image data, command data instructing to form an image corresponding to the image data on a recording medium having a storing part and to write embedded data to the storing part, and first selection data indicating whether or not the image should be formed when the embedded data cannot be written in the storing part. The image-forming device includes a receiving unit, an image-forming unit, and a controlling unit. The receiving unit receives the image data, the command data and the first selection data. The image-forming unit is capable of forming the image on the recording medium in accordance with the image data and the command data, and capable of writing embedded data in the storing unit in accordance with the command data. The controlling unit controls, when the image-forming unit cannot write the embedded data in the storing unit, the image-forming unit to form the image if the first selection data indicates that the image should be formed, and to fail to form the image if the first selection data indicates that the image should not be formed.

Another aspect of the present invention provides a transmission device including a transmitting unit that transmits image data, command data instructing to form an image corresponding to the image data on a recording medium having a storing part and to write embedded data to the storing part, and first selection data indicating whether or not the image should be formed when the embedded data cannot be written in the storing part, to an image-forming device.

Another aspect of the present invention provides an image-forming device including a receiving unit, an image-forming unit, and a controlling unit. The receiving unit is capable of receiving image data, command data instructing to form an image corresponding to the image data on a recording medium having a storing part and to write embedded data to the storing part, and first selection data indicating whether or not the image should be formed when the embedded data cannot be written in the storing part. The image-forming unit is capable of forming the image on the recording medium in accordance with the image data and the command data, and capable of writing embedded data in the storing unit in accordance with the command data. The controlling unit controls, when the image-forming unit cannot write the embedded data in the storing unit, the image-forming unit to form the image if the first selection data indicates that the image should be formed, and to fail to form the image if the first selection data indicates that the image should not be formed.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a preferred embodiment of the present invention will be described while referring to the accompanying drawings.

<Facsimile Communication System>

Figure 1:
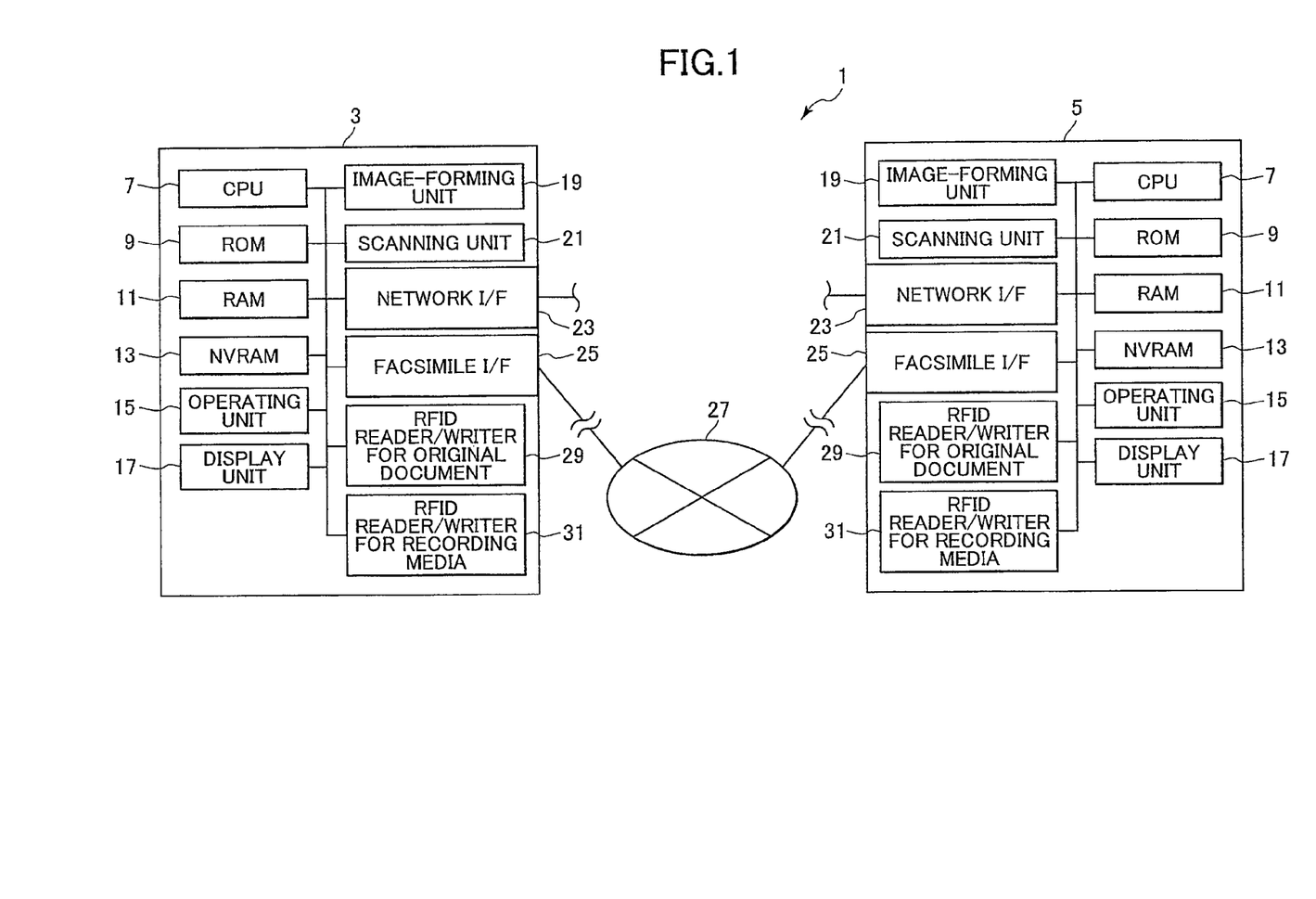
FIG. 1 is a block diagram showing an overall structure of a facsimile communication system according to a preferred embodiment of the present invention.

FIG. 1 is a block diagram showing the overall structure of a facsimile communication system 1 according to a preferred embodiment of the present invention. The facsimile communication system 1 is configured of two multifunction peripherals (MFPs) 3 and 5, each having at least a facsimile communication function. The MFPs 3 and 5 are capable of exchanging image data (facsimile data) with each other. For the sake of simplicity, the following description will cover the process in which the MFP 3 transmits image data to the MFP 5, and the MFP 5 forms (prints) an image based on the image data received from the MFP 3. Accordingly, the MFP 3 will also be referred to as the transmission-side MFP 3 and the MFP 5 as the reception-side MFP 5.

The hardware configurations of the MFPs 3 and 5 may differ, provided that both have at least a facsimile function. However, to simplify the description of the preferred embodiment, the MFPs 3 and 5 will share the same basic hardware configuration that includes a printer function, scanner function, and copier function in addition to the facsimile function. In the preferred embodiment, each of the MFPs 3 and 5 has a CPU 7, a ROM 9, a RAM 11, a NVRAM 13 (nonvolatile memory), an operating unit 15, a display unit 17, an image-forming unit 19, and a scanning unit 21.

The ROM 9 stores programs for executing various operations on the MFPs 3 and 5, such as a facsimile communication process described later. The CPU 7 reads programs from the ROM 9 and executes the programs to perform various control processes while storing the results of operations in the RAM 11 or NVRAM 13. The operating unit 15 includes a plurality of buttons by which the user can perform input operations. The display unit 17 includes a liquid crystal display and lamps for displaying configuration screens, the status of device operations, and the like.

Each of the MFPs 3 and 5 also includes a network interface 23 and a facsimile interface 25. The network interface 23 connects the MFP 3 or 5 to an external computer (not shown) or the like via a network, enabling bi-directional communications between the two devices. The facsimile interface 25 connects the MFP 3 or 5 to another facsimile device via a public telephone network 27, enabling facsimile communications between the two devices.

Each of the MFPs 3 and 5 also includes an RFID reader/writer 29 for reading from or writing to RFID tags in original documents and an RFID reader/writer 31 for reading from or writing to RFID tags in sheet-like recording media. These RFID reader/writers will be described later in greater detail.

<Structure of the Multifunction Peripheral>

Figure 2:
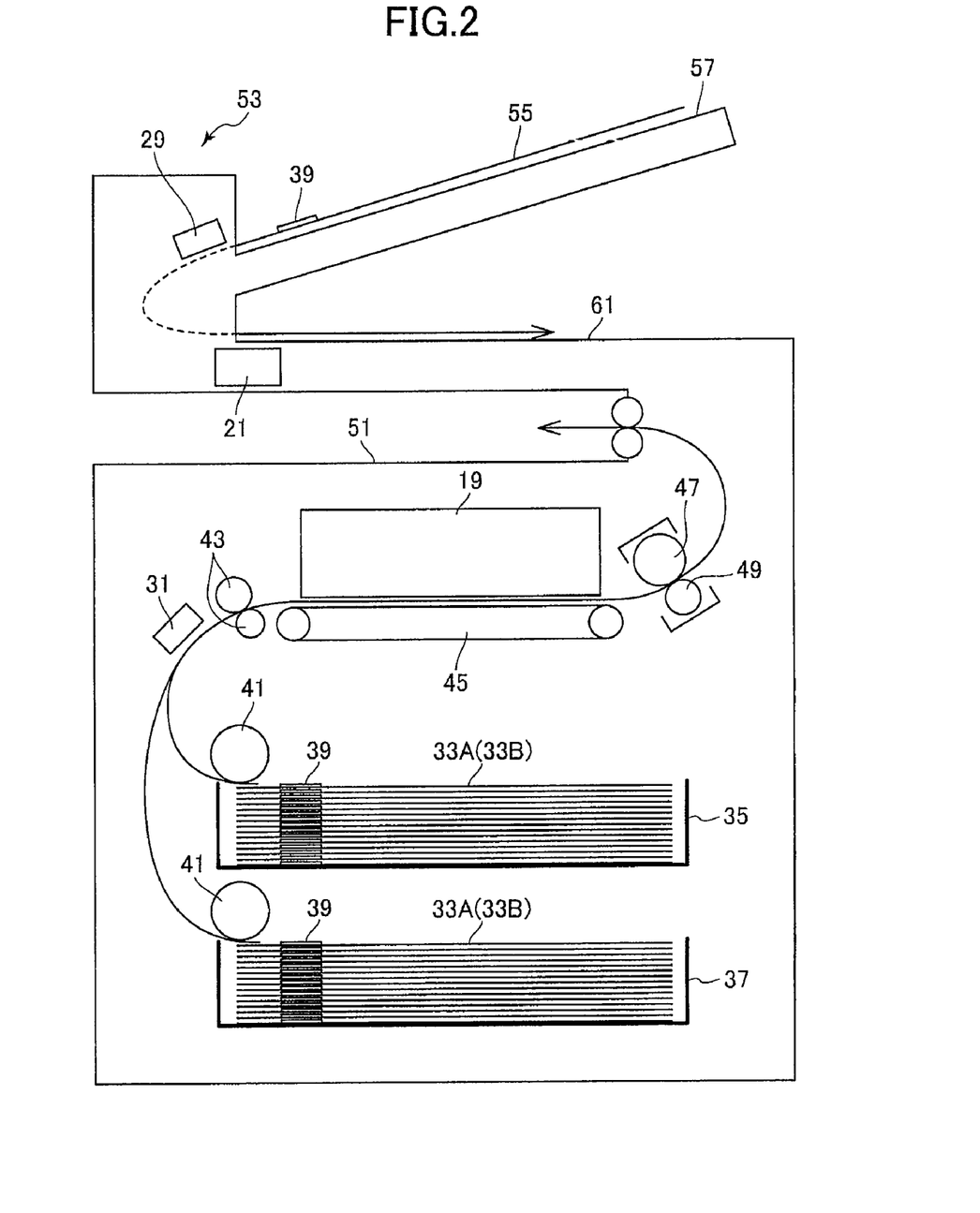
FIG. 2 conceptually illustrates an internal structure of an MFP.

FIG. 2 conceptually illustrates the internal structure of the transmission-side MFP 3, for example, while the reception-side MFP 5 has the same structure in the preferred embodiment. One or more trays (two trays 35 and 37 in the preferred embodiment) are provided in the bottom section of the transmission-side MFP 3. The trays 35 and 37 accommodate sheets 33 of a paper or other recording medium on which images are to be formed. The sheets 33 include sheets with RFID tags 39 (hereinafter referred to as "RFID sheets 33A") and normal sheets without RFID tags 39 (hereinafter referred to as "normal sheets 33B"). The RFID sheets 33A may be configured of RFID tags embedded in sheets 33 or RFID tags attached to the surfaces of the sheets 33.

A pickup roller 41 disposed above one end of each of the trays 35 and 37 picks up and conveys sheets 33 accommodated in the respective trays 35 and 37 to a pair of registration rollers 43 one sheet at a time. The RFID reader/writer 31 is disposed near the conveying path along which the sheets 33 are conveyed between the trays 35 and 37 and the registration rollers 43. The RFID reader/writer 31 can communicate wirelessly with (read data from or write data to) the RFID tag 39 in a RFID sheet 33A as the RFID sheet 33A is being conveyed through radio waves emitted from an antenna (not shown). Hence, if the sheet 33 being conveyed is a RFID sheet 33A, the RFID reader/writer 31 can exchange data with the RFID tag 39 in the RFID sheet 33A.

When a sheet 33 reaches the registration rollers 43, the registration rollers 43 adjust the registration of the sheet 33 and convey the sheet 33 onto a conveying belt 45 at a prescribed timing. The conveying belt 45 continues to convey the sheet 33 while the image-forming unit 19 forms a monochrome or color image thereon based on image data received in a facsimile communication, for example. The image formed on the surface of the sheet 33 is subsequently fixed to the sheet by heat as the sheet 33 is interposed between a heating roller 47 and a pressure roller 49 in a fixing unit disposed downstream of the conveying belt 45. The sheet 33 is subsequently discharged onto a discharge tray 51.

A document-reading unit 53 is disposed above the discharge tray 51. The document-reading unit 53 includes a document tray 57 in which an original document 55 is set. The original document 55 may include one or more RFID sheets 33A on the surfaces of which original images are formed, and/or one or more normal sheets 33B on the surfaces of which original images are formed. The document-reading unit 53 also includes a conveying mechanism (not shown) for conveying the original document 55, and a scanning unit 21 disposed near the path along which the original document 55 is conveyed. The conveying mechanism conveys the original document 55 set in the document tray 57 through the scanning region of the scanning unit 21 and subsequently discharges the original document 55 on a document discharge tray 61. The scanning unit 21 generates image data by reading images formed on the original document 55 as the original document 55 is conveyed thereby, and transmits this image data to the CPU 7.

The RFID reader/writer 29 for original documents is disposed near the conveying path of the original document 55 between the document tray 57 and the scanning unit 21. If the sheet of the original document 55 being conveyed on the conveying path is a RFID sheet 33A, the RFID reader/writer 29 can exchange data with the RFID tag 39 provided in the RFID sheet 33A through wireless communications.

<Facsimile Communication>

Figure 3:
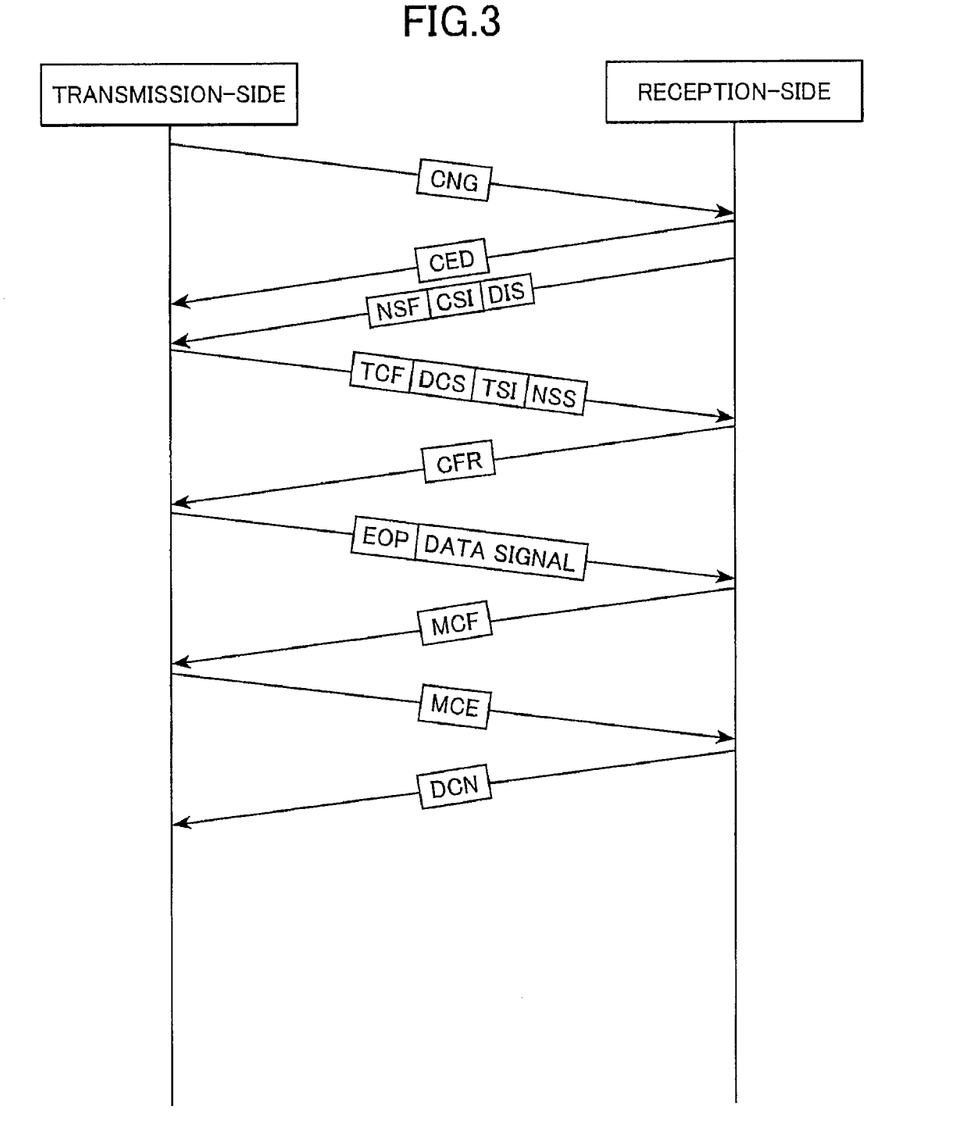
FIG. 3 shows a sequence of operations performed during a facsimile communication.
Figure 4:
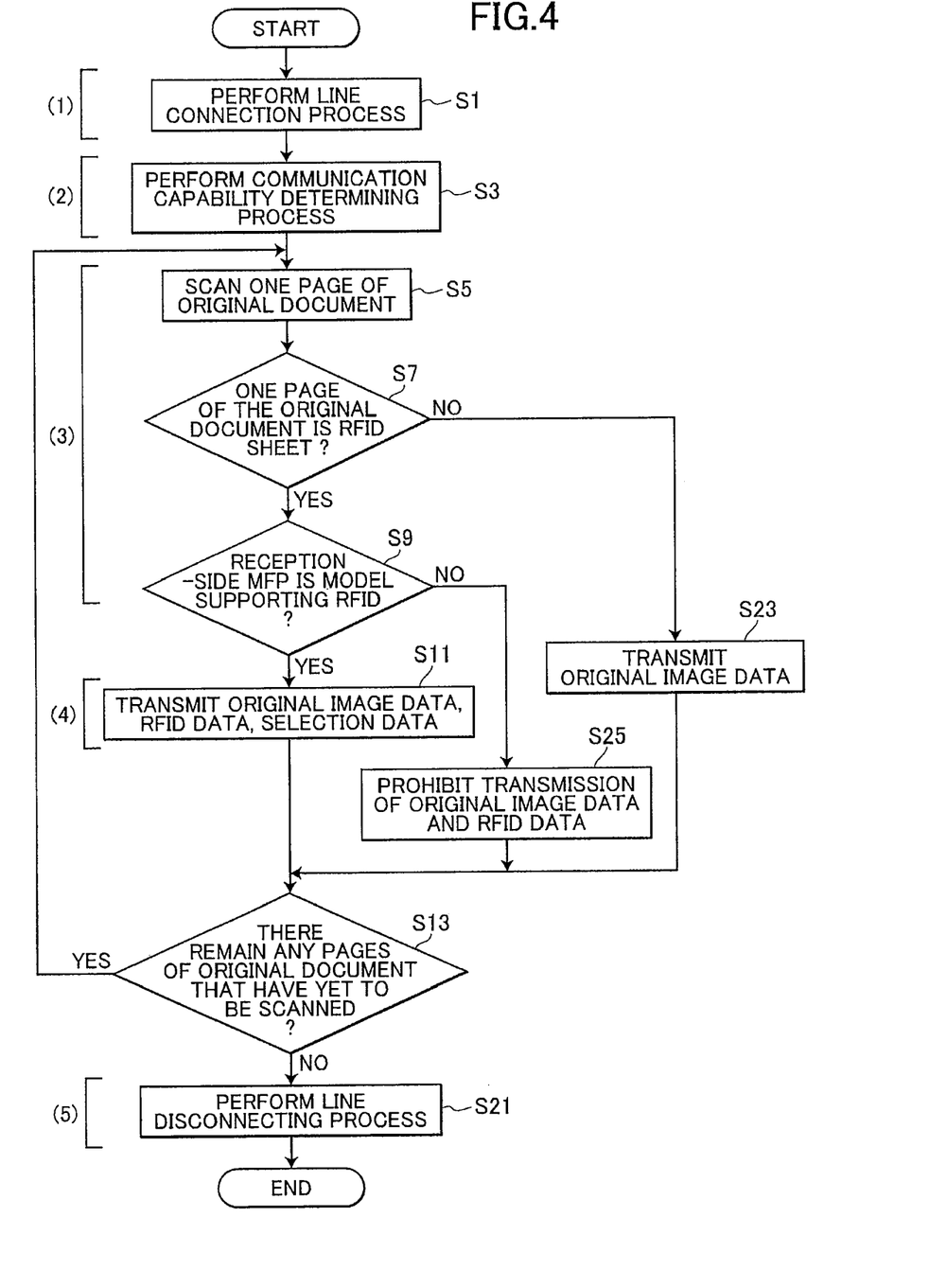
FIG. 4 is a flowchart illustrating steps in the facsimile communication process executed on a transmission-side MFP.
Figure 5:
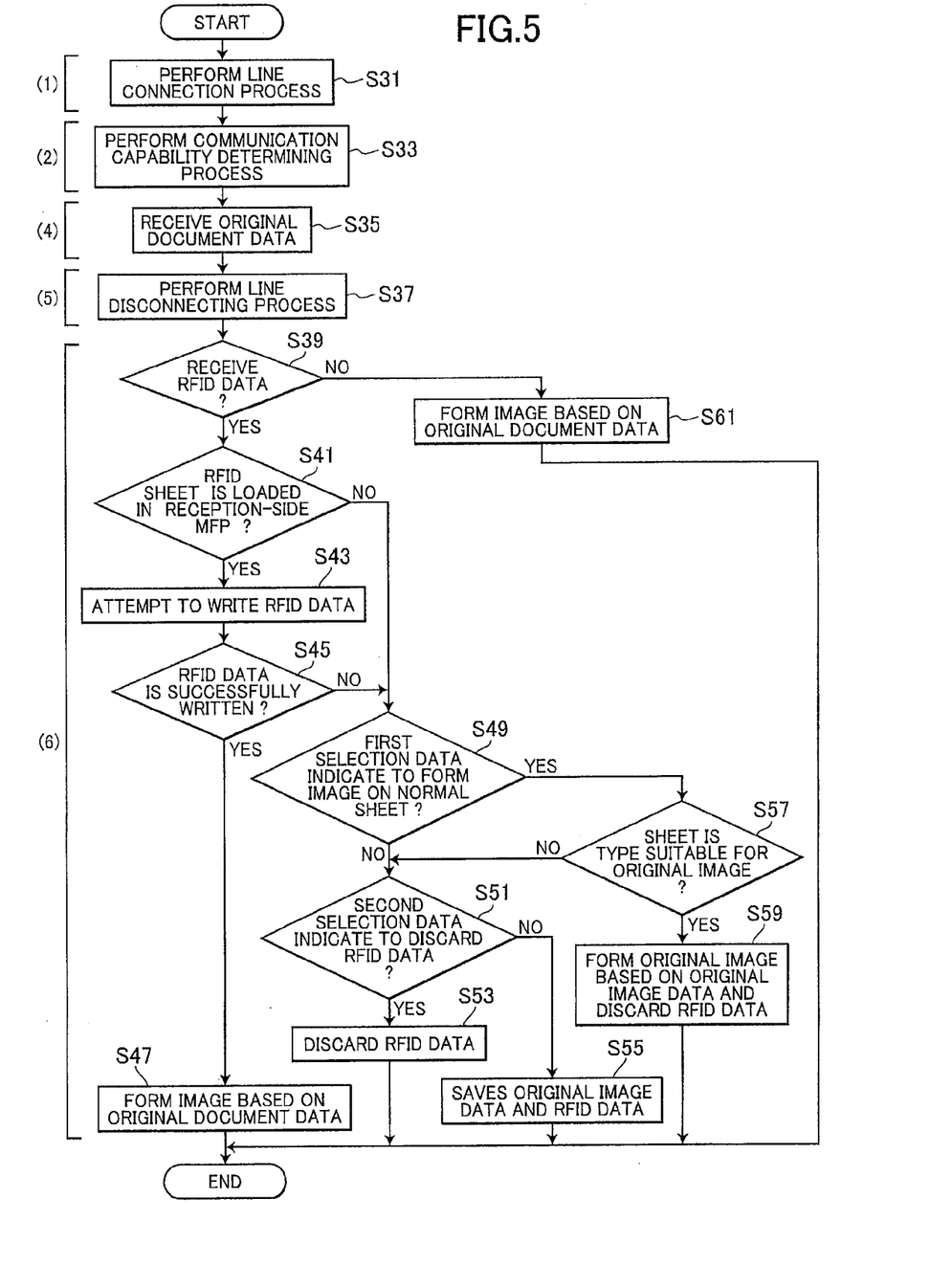
FIG. 5 is a flowchart illustrating steps in the facsimile communication process executed on a reception-side MFP.

FIG. 3 shows the sequence of operations performed during a facsimile communication. FIG. 4 is a flowchart illustrating steps in the facsimile communication executed on the transmission-side MFP 3, and FIG. 5 is a flowchart illustrating steps in the process executed on the reception-side MFP 5. If the reception-side MFP 5 is unable to write RFID data at this time, such as when the reception-side MFP 5 has no RFID sheets 33A or when the reception-side MFP 5 has RFID sheets 33A but the RFID tags 39 in the RFID sheets 33A are read-only, this process can reflect the wishes of the user on the transmission-side MFP 3 regarding whether to allow the reception-side MFP 5 to form an image of the original document. The numbers in parentheses in FIGS. 4 and 5 are stage numbers to be described next.

In the facsimile communication, the user can also perform a first selection on the operating unit 15 to select either an authorized mode or an unauthorized mode. In the authorized mode, the reception-side MFP 5 is allowed to form images of the original document when the reception-side MFP 5 cannot write RFID data. In the unauthorized mode, the reception-side MFP 5 is not authorized to form images of the original document in this case.

Further, in the facsimile communication process, the user of the transmission-side MFP 3 can also make a second selection on the operating unit 15 to select either a discard mode or a save mode. In the discard mode, at least one of original image data and RFID data transmitted from the transmission-side MFP 3 is discarded when the reception-side MFP 5 cannot write RFID data, while in the save mode the data may be saved on the reception-side MFP 5 at this time. Further, in the preferred embodiment, the first selection and the second selection can be performed individually for each page of the original document. The CPU 7 of the transmission-side MFP 3 executes the process shown in FIG. 4 based on these settings and operations.

The facsimile communication starts when the user on the transmission-side sets one or a plurality of sheets of the original document 55 in the document tray 57 of the transmission-side MFP 3 and performs an input operation on the operating unit 15 for initiating a facsimile transmission. The plurality of sheets of the original document 55 may be a mixture of RFID sheets 33A and normal sheets 33B.

(1) Line Connection Stage

In the line connection stage, and in S1 of FIGS. 4 and S31 of FIG. 5, the MFPs 3 and 5 perform a lone connection process for establishing a connection therebetween. More specifically, as shown in FIG. 3, the CPU 7 of the transmission-side MFP 3 transmits a CNG (call) signal to a telephone exchange via the facsimile interface 25, whereby the telephone exchange calls the reception-side MFP 5. In response to this case, the CPU 7 of the reception-side MFP 5 returns a CED (response) signal to the telephone exchange via the facsimile interface 25, at which point the process enters the preliminary communication stage (negotiation).

(2) Preliminary Communication Stage

In the preliminary communication stage, S3 of FIG. 4 and S33 of FIG. 5, the MFPs 3 and 5 perform a communication capability determining process for determining the communication capabilities of each other for performing facsimile communications. More specifically, as shown in FIG. 3, the CPU 7 of the reception-side MFP 5 transmits an NSF signal, CSI signal, and DIS signal to the transmission-side MFP 3. The NSF signal stands for a "non-standard facilities" signal, and allows the two devices to freely set the communication mode (transmission protocol and transfer rate, for example) and other data to proprietary modes. In the preferred embodiment, model data is set in the NSF signal, for example, indicating whether the reception-side MFP 5 is a model capable of writing data to the RFID tag 39 of the RFID sheet 33A (a model supporting RFID). The CSI signal stands for a "called station identification" signal. The DIS signal is a "digital identification" signal for describing the communication capabilities of the reception-side MFP 5 among preset standards.

Upon receiving these signals from the reception-side MFP 5, in S3 the CPU 7 of the transmission-side MFP 3 sets the communication mode that will be used for the current session from among the communication capabilities supported by the reception-side MFP 5 based on the DIS signal and the NSF signal. The CPU 7 of the transmission-side MFP 3 then returns data indicating this communication mode to the reception-side MFP 5. More specifically, as shown in FIG. 3, the transmission-side MFP 3 returns an NSS signal, TSI signal, DCS signal, and TCF signal to the reception-side MFP 5.

The NSS signal stands for a "non-standard setup" signal for describing the communication mode set at the reception-side MFP 5 based on the communication mode set at the transmission-side MFP 3. The TSI signal stands for a "transmission subscriber identification" signal. The DCS signal is a digital command signal for notifying the reception-side device of the communication mode set on the transmission side. The TCF signal stands for a "training check" signal. Upon receiving this TCF signal, the CPU 7 of the reception-side MFP 5 transmits a CFR signal to the transmission-side MFP 3 to notify the transmission-side MFP 3 that data was received normally. At this point, the communication settings are complete, and the process enters the original image reading stage.

(3) Original Image Reading Stage

The CPU 7 of the transmission-side MFP 3 conveys one page of the original document 55 set in the document tray 57 to the scanning region of the scanning unit 21, acquires original image data generated by the scanning unit 21, and temporarily stores this data in a buffer region of the NVRAM 13, for example. If this page of the original document is a RFID sheet 33A, the CPU 7 additionally uses the RFID reader/writer 29 to read RFID data stored in the RFID tag 39 of the RFID sheet 33A and temporarily stores this RFID data in the buffer region, for example. This RFID data may include unique data identifying the RFID sheet 33A of the original document (a serial number or the like), confidential information, data identifying the sender, and data identifying the intended recipient.

The CPU 7 determines whether the page of the original document is a RFID sheet 33A based on whether the RFID reader/writer 29 can read RFID data. Based on this determination, the CPU 7 determines the need to include command data instructing the reception-side MFP 5 to write RFID data to the RFID tag 39 of the RFID sheet 33A used for forming an image of the original document.

Specifically, if the page of the original is the normal sheet 33B (S7: NO), the CPU 7 determines that the command data is not necessary and advances to S23, at which point the process shifts to the original image transmission/reception stage. On the other hand, if the page of the original document is a RFID sheet 33A (S7: YES), the CPU 7 provisionally determines that the command data is necessary and in S9 determines whether the reception-side MFP 5 is a model supporting RFID based on the model data received in the preliminary communication stage.

If the reception-side MFP 5 supports RFID (S9: YES), then the CPU 7 sets the final determination to the need for command data and advances to S11, at which point the process shifts to the original image transmission/reception stage. Further, if the CPU 7 determines that the reception-side MFP 5 does not support RFID (S9: NO), the CPU 7 cancels the provisional setting and in S25 prohibits the transmission of the original image data and the RFID data. Specifically, the CPU 7 discards the original image data and RFID data from the buffer region and advances to S13.

(4) Original Image Transmission/Reception Stage

If the CPU 7 of the transmission-side MFP 3 makes a final determination that command data is required (S9: YES), in S11 the CPU 7 transmits the original image data, RFID data, first selection data, and second selection data to the reception-side MFP 5. Specifically, as shown in FIG. 3, the CPU 7 of the transmission-side MFP 3 transmits a data signal including the original image data, RFID data, first selection data, and second selection data and an EOP signal indicating the end of the data signal packet to the reception-side MFP 5, and subsequently advances to S13. Here, the RFID data also serves as command data instructing the reception-side MFP 5 to write RFID data. The first section data is set to either the authorized mode or the unauthorized mode, and the second selection data is set to either the discard mode or the save mode, by the user.

If the CPU 7 of the transmission-side MFP 3 determines in S7 that the page of the original document is a normal sheet 33B (S7: NO), in S23 the CPU 7 transmits only the original image data and advances to S13. If there remain any pages of the original document that have yet to be scanned (S13: YES), the CPU 7 returns to S5 and repeats the above process. However, if all pages of the original document have been scanned (S13: NO), the CPU 7 advances to S21 and the process enters the line disconnection stage.

(5) Line Disconnection Stage

If the CPU 7 of the reception-side MFP 5 confirmed that the data signal was received normally in S35, then in the line disconnection stage shown in FIG. 3 and in S37 of FIG. 5 the CPU 7 returns an MCF signal to the transmission-side MFP 3. After confirming that the MCF signal was received, in S21 the CPU 7 of the transmission-side MFP 3 transmits an MCE signal to the reception-side MFP 5 in response. Upon receiving this MCE signal, the reception-side MFP 5 disconnects the line by returning a DCN signal, ending the transmission-side portion of the facsimile communication process.

(6) Original Image Processing Stage

In the original image processing stage, the CPU 7 of the reception-side MFP 5 executes a process based on the existence of RFID data and the content of the first and second selection data received from the transmission-side MFP 3. Specifically, in S39 the CPU 7 of the reception-side MFP 5 determines whether RFID data was received. If RFID data was received (S39: YES), the CPU 7 assumes that a command to write RFID data was received from the transmission-side MFP 3 and advances to S41. However, if RFID data was not received (S39: NO), in S61 the CPU 7 of the reception-side MFP 5 forms an image of the original document based on the received original image data, and subsequently ends the facsimile communication process.

(A) When RFID Data Can be Written Normally

In S41 the CPU 7 of the reception-side MFP 5 determines whether there are RFID sheets 33A loaded in either of the trays 35 and 37 of the reception-side MFP 5. If one of the trays 35 and 37 has RFID sheets 33A (S41: YES), in S43 the CPU 7 attempts to write the RFID data to the RFID tag 39 of the RFID sheet 33A using the RFID reader/writer 31 while conveying the RFID sheet 33A toward the registration rollers 43.

If the RFID data was successfully written to the RFID sheet 33A being conveyed toward the registration rollers 43 (S45: YES), in S47 the CPU 7 drives the registration rollers 43 to convey the RFID sheet 33A to the image-forming unit 19, forms an image of the original document based on the original image data, and subsequently ends the facsimile communication process. As a result of this process, the reception-side MFP 5 forms an image of the original document on the surface of the RFID sheet 33A based on the data received from the transmission-side MFP 3 and writes the RFID data received from the transmission-side MFP 3 to the RFID tag 39 of the RFID sheet 33A.

(B) When RFID Data Cannot be Written Normally

The CPU 7 of the reception-side MFP 5 advances to S49 if neither the tray 35 nor the tray 37 has RFID sheets 33A (S41: NO), or if one of the trays 35 and 37 has RFID sheets 33A but the RFID data could not be properly written to the RFID tag 39 of the RFID sheet 33A (S45: NO). Examples in which the CPU 7 cannot write RFID data properly include cases in which the RFID tag 39 in the RFID sheet 33A is read-only and cases in which a write error occurs due to insufficient capacity of the RFID tag 39 for storing the data.

In S49 the CPU 7 determines whether image processing of the original image data is authorized even when RFID data cannot be properly written. Specifically, the CPU 7 determines which of the authorized mode and unauthorized mode was selected on the transmission-side MFP 3 based on the first selection data. If image processing is authorized (S49: YES), in S57 the CPU 7 determines whether the type (size, material, and the like) of the sheet 33 currently gripped by the registration rollers 43 is suitable for forming the original image based on configuration data for the trays and detection results by sensors (not shown), for example.

If the sheet 33 is a type suitable for the original image (S57: YES), in S59 the CPU 7 conveys the sheet 33 to the image-forming unit 19, forms the original image based on the original image data, discards the RFID data, and subsequently ends the facsimile communication process.

However, if the CPU 7 determines that image processing of the original image data is not authorized in this case (S49: NO), in S51 the CPU 7 determines whether an instruction to discard the original image data and the RFID data was received. Specifically, the CPU 7 determines which of the discard mode and save mode was selected on the transmission-side MFP 3 based on the second selection data. The CPU 7 also advances to S51 when the sheets 33 loaded in the trays are not suitable for forming the original image (S57: NO).

If the CPU 7 determines in S51 that an instruction was received to discard the original image data and RFID data (S51: YES), in S53 the CPU 7 discards at least one of the original image data and the RFID data, discharges the sheet 33 currently gripped by the registration rollers 43 onto the discharge tray 51 without forming an image thereon, and subsequently ends the facsimile communication process. Here, it is preferable for the CPU 7 to discard both the original image data and the RFID data if the content of both is sensitive because discarding both data can prevent the reception-side MFP 5 from outputting this data against the wishes of the user on the transmission side.

If the CPU 7 of the reception-side MFP 5 determines that no instruction was received to discard this data (S51: NO), in S55 the CPU 7 saves the original image data and RFID data in the NVRAM 13, for example, discharges the sheet 33 currently gripped by the registration rollers 43 onto the discharge tray 51 without forming an image thereon, and subsequently ends the facsimile communication process. Saving the data in this way enables the reception-side MFP 5 to subsequently form the original image on a RFID sheet 33A and write the RFID data to the RFID tag 39 of the RFID sheet 33A when able to at least meet the condition of being able to write RFID data, such as when appropriate RFID sheets 33A are loaded in the reception-side MFP 5.

<Effects of the Embodiment>

(1) According to the preferred embodiment, the CPU 7 of the transmission-side MFP 3 transmits the first selection data to the reception-side MFP 5 for indicating whether the reception-side MFP 5 is authorized to form the original image when unable to write RFID data. The reception-side MFP 5 determines whether to form the original image when unable to write RFID data based on the content of the first selection data. Accordingly, this system of the preferred embodiment prevents the reception-side MFP 5 from going against the wishes of the user on the transmission side, thereby improving user-friendliness for the transmission-side user.

Accordingly, when the user on the transmission side wishes to authorize the formation of the original image only when the reception-side MFP 5 can write RFID data, the system of the preferred embodiment can prevent the reception-side MFP 5 from forming the original image anyway against the user's wishes.

(2) The CPU 7 of the transmission-side MFP 3 also transmits the second selection data to the reception-side MFP 5 for instructing the reception-side MFP 5 to discard at least one of the original image data and the RFID data when unable to write RFID data. The reception-side MFP 5 determines whether to discard this data when unable to write RFID data based on the content of the second selection data. Hence, the system of the preferred embodiment prevents the reception-side MFP 5 from going against the wishes of the user on the transmission side, thereby improving user-friendliness for the transmission-side user.

(3) The first and second selections can also be performed independently for each page of the original document. Hence, the system of the preferred embodiment can reflect the wishes of the user on the transmission side for each page of the original document if the document includes a mixture of RFID sheets 33A and normal sheets 33B.

(4) If the reception-side MFP 5 is not a model that supports RFID (S9: NO), at the least there is no need to transmit RFID data. Hence, by prohibiting the transmission of the RFID data in this case, the transmission-side MFP 3 can reduce the amount of unnecessary data transmissions. Note that the transmission of the original image data may be also prohibited.

(5) The CPU 7 of the transmission-side MFP 3 determines whether the page of the original document is a RFID sheet 33A and, based on the determination results, determines whether to transmit command data instructing the reception-side MFP 5 to write RFID data to the RFID tag 39 of the RFID sheet 33A on which the original image is to be formed. Through this process, the transmission-side MFP 3 can automatically determine whether to include command data, without requiring the user of the transmission-side MFP 3 to indicate through a manual operation whether to include command data.

While the invention has been described in detail with reference to the embodiment thereof, it would be apparent to those skilled in the art that various changes and modifications may be made therein without departing from the spirit of the invention.

(1) While the facsimile communication system 1 is used as the preferred embodiment of the present invention, the present invention is not limited to this system. For example, the present invention may be applied to a computer-printing system comprising a personal computer or other transmission device, and an image-forming device having at least a printer function.

(2) In the preferred embodiment described above, the first and second selections are made according to user operations, but the present invention is not limited to this method of specification. For example, the transmission-side MFP 3 may automatically set the first and second selection data based on data read by the RFID reader/writer 29. More specifically, the transmission-side MFP 3 may select the unauthorized mode and the discard mode when the data read by the RFID reader/writer 29 meets a prescribed prohibiting condition, such as when the data includes the keyword "confidential," for example, or identification data for a specific user.

(3) In the preferred embodiment described above, the transmission-side MFP 3 repeatedly executes the process from S7 to S11, S23, or S25 in FIG. 4 each time one page of the original document is scanned, but the transmission-side MFP 3 may execute this process for original images on all pages at the same time after first scanning all pages of the original document. In this case, when the reception-side MFP 5 does not support RFID (S9: NO), the transmission-side MFP 3 prohibits the transmission of original image data and RFID data for all pages.

Further, in this case, the transmission-side MFP 3 may execute the process to scan all pages of the original document (S5) prior to the line connection process (S1) shown in FIG. 4, set the first and second selection data common to the all pages, and transmit, for example, the NSS signal including the set first and second selection data thorough a transmission area in the communication capabilities determining process (S3). By using this transmission area for setting the communication capabilities in the preliminary communication stage, the transmission-side MFP 3 can efficiently transmit the first selection data and the like to the reception-side MFP 5.

(4) In the preferred embodiment described above, the RFID reader/writer 31 is disposed near the conveying path along which the sheet 33 is conveyed between the trays 35 and 37 to the registration rollers 43, but the present invention is not limited to this configuration. For example, a RFID reader/writer 31 may be disposed near each of the trays 35 and 37 and may attempt to write RFID data to the RFID tag 39 of the RFID sheets 33A while the RFID sheets 33A are accommodated in the respective trays 35 and 37. With this configuration, the reception-side MFP 5 can determine whether the sheets 33 accommodated in the trays 35 and 37 are RFID sheets 33A before initiating an operation to convey a sheet 33 from the tray 35 or 37. Alternatively, a sensor other than the RFID reader/writer 31 may be provided for making this determination. For example, a photosensor may be used to detect changes in the quantity of reflected light caused by the existence of an RFID tag (existence of a bulging part in the sheets 33), or a magnetic sensor may be used to detect changes in a magnetic field caused by the existence of an RFID tag.

(5) In the preferred embodiment described above, the data that the reception-side MFP 5 is to write to and store in the RFID tag of the RFID sheet 33A is RFID data received from the transmission-side MFP 3, but the present invention is not limited to this configuration. For example, if the reception-side MFP 5 receives command data (not the RFID data itself) from the transmission-side MFP 3 instructing the reception-side MFP 5 to write RFID data, the reception-side MFP 5 may write control data managed by the reception-side MFP 5 itself to the RFID tag. The control data includes data for tracking and verification, such as unique data identifying each RFID sheet 33A, and data generated based on transmission data acquired from the transmission-side MFP 3 (data identifying the sender, for example).

(6) In the preferred embodiment described above, the reception-side MFP 5 is completely prohibited from forming images based on the original image data and must discard the original image data when unable to write the RFID data and when the unauthorized mode has been selected, but the present invention is not limited to this method of restriction. For example, the reception-side MFP 5 may be allowed to form the original images at a reduced quality or to form only some of the images, provided that the reception-side MFP 5 is restricted from forming the unaltered original images.

What is claimed is:

1. An image-forming system comprising:
    a transmission device comprising a transmitting unit configured to transmit image data, command data instructing to form an image corresponding to the image data on a recording medium having a storing part and to write embedded data to the storing part, and first selection data indicating whether or not the image should be formed when the embedded data cannot be written in the storing part; and
    an image-forming device comprising:
        a receiving unit configured to receive the image data, the command data and the first selection data;
        an image-forming unit capable of forming the image on the recording medium in accordance with the image data and the command data, and capable of writing embedded data in the storing unit in accordance with the command data; and
        a controlling unit configured to control, when the image-forming unit cannot write the embedded data in the storing unit, the image-forming unit to form the image if the first selection data indicates that the image should be formed, and to fail to form the image if the first selection data indicates that the image should not be formed.

2. The image-forming system according to claim 1, wherein the transmitting unit further transmits the embedded data and second selection data indicating whether or not the embedded data should be ignored when the embedded data cannot be written in the storing part, and
wherein the controlling unit controls, when the image-forming unit cannot write the embedded data in the storing unit, the image-forming unit to save the embedded data if the second selection data indicates that the embedded data should not be ignored, and to discard at least one of the image data and the embedded data if the second selection data indicates that the embedded data should be ignored.

3. The image-forming system according to claim 1, wherein the transmitting device further comprises:
a tray on which an original document is configured to be set; and
an image-reading unit configured to read an original image formed on the original document to generate the image data,
wherein the transmitting unit is configured to transmit at least one of the command data and the first selection data for each original document.

4. The image-forming system according to claim 1, wherein the transmitting device further comprises:
a tray on which an original document is configured to be set;
an image-reading unit configured to read an original image formed on the original document to generate the image data; and
a processor configured to determine whether or not the original document has the storing part,
wherein the transmitting unit fails to transmit the command data, if the processor determines that the original document does not have the storing part.

5. The image-forming system according to claim 1, wherein the transmitting unit transmits the image data to the receiving unit using a transmission area for determining a communication capability between the transmission device and the image-forming device in a facsimile communication, and
wherein the transmitting unit also transmits the first selection data using the transmission area, before transmitting the image data.

6. A transmission device comprising:
a transmitting unit configured to transmit image data, command data instructing to form an image corresponding to the image data on a recording medium having a storing part and configured to write embedded data to the storing part, and first selection data indicating whether or not the image should be formed when the embedded data cannot be written in the storing part, to an image-forming device.

7. The transmission device according to claim 6, further comprises:
a processor configured to:
determine whether or not the image-forming device has a function for writing the embedded data to the storing part; and
prohibit the transmitting unit from transmitting the image data, if the image-forming device is determined not to have the function.

8. The transmission device according to claim 6, further comprising:
a tray on which an original document is configured to be set; and
an image-reading unit configured to read an original image formed on the original document to generate the image data,
wherein the transmitting unit is configured to transmit at least one of the command data and the first selection data for each original document.

9. The transmission device according to claim 6, further comprising:
a tray on which an original document is configured to be set;
an image-reading unit configured to read an original image formed on the original document to generate the image data; and
a processor configured to determine whether or not the original document has the storing part,
wherein the transmitting unit fails to transmit the command data, if the processor determines that the original document does not have the storing part.

10. The transmission device according to claim 6, wherein the transmitting unit transmits the image data, to the image-forming device using a transmission area for determining a communication capability between the transmission unit and the image-forming device in a facsimile communication, and
wherein the transmitting unit also transmits the first selection data using the transmission area, before transmitting the image data.

11. An image-forming device comprising:
a receiving unit capable of receiving image data, command data instructing to form an image corresponding to the image data on a recording medium having a storing part and to write embedded data to the storing part, and first selection data indicating whether or not the image should be formed when the embedded data cannot be written in the storing part;
an image-forming unit capable of forming the image on the recording medium in accordance with the image data and the command data, and capable of writing embedded data in the storing unit in accordance with the command data; and
a controlling unit configured to control, when the image-forming unit cannot write the embedded data in the storing unit, the image-forming unit to form the image if the first selection data indicates that the image should be formed, and to fail to form the image if the first selection data indicates that the image should not be formed.

12. The image-forming device according to claim 11, wherein the receiving unit is further capable of receiving the embedded data and second selection data indicating whether or not the embedded data should be ignored when the embedded data cannot be written in the storing part, and
wherein the controlling unit controls, when the image-forming unit cannot write the embedded data in the storing unit, the image-forming unit to save the embedded data if the second selection data indicates that the embedded data should not be ignored, and to discard at least one of the image data and the embedded data if the second selection data indicates that the embedded data should be ignored.

* * * * *